United States Patent
Smith et al.

(10) Patent No.: US 8,268,055 B2
(45) Date of Patent: Sep. 18, 2012

(54) MEMBRANE GAS DRYERS INCORPORATING ROTATABLE FITTINGS

(75) Inventors: T. Paul Smith, Oakhurst, NJ (US); David J. Burke, Brick, NJ (US)

(73) Assignee: Perma Pure LLC, Toms River, NJ (US)

( * ) Notice: Subject to any disclaimer, the term of this patent is extended or adjusted under 35 U.S.C. 154(b) by 0 days.

(21) Appl. No.: 13/086,634

(22) Filed: Apr. 14, 2011

(65) Prior Publication Data
US 2011/0203458 A1      Aug. 25, 2011

Related U.S. Application Data

(63) Continuation of application No. PCT/US2011/025665, filed on Feb. 22, 2011.

(60) Provisional application No. 61/308,161, filed on Feb. 25, 2010.

(51) Int. Cl.
*B01D 53/22* (2006.01)

(52) U.S. Cl. ............. 96/9; 95/45; 95/52; 96/7; 96/10

(58) Field of Classification Search ............ 95/45, 52; 96/7, 9, 10
See application file for complete search history.

(56) References Cited

U.S. PATENT DOCUMENTS

| | | | |
|---|---|---|---|
| 4,612,019 A * | 9/1986 | Langhorst | 95/52 |
| 5,108,464 A * | 4/1992 | Friesen et al. | 95/52 |
| 6,070,339 A | 6/2000 | Cunkelman | |
| 6,527,951 B1 | 3/2003 | Tuvim | |
| 6,585,808 B2 * | 7/2003 | Burban et al. | 96/8 |
| 7,014,765 B2 * | 3/2006 | Dannenmaier | 210/321.8 |
| 7,708,812 B2 * | 5/2010 | Shinkai et al. | 96/10 |
| 2002/0069758 A1 | 6/2002 | Burban et al. | |
| 2008/0190293 A1 | 8/2008 | Deubler et al. | |

FOREIGN PATENT DOCUMENTS

JP          2006346635 A      12/2006

OTHER PUBLICATIONS

Machine translation of JP 2006-346635, Dec. 28, 2006.*
International Search Report and Written Opinion dated Nov. 21, 2011 pertaining to International Application No. PCT/US2011/025665.

* cited by examiner

*Primary Examiner* — Jason M Greene
*Assistant Examiner* — Anthony Shumate
(74) *Attorney, Agent, or Firm* — Dinsmore & Shohl LLP (57) ABSTRACT

A membrane gas dryer includes an upstream fitting assembly, a downstream fitting assembly, a purge tube, and a sample element. The upstream fitting assembly and the downstream fitting assembly include fitting bodies and barrier sleeves. The fitting bodies and the barrier sleeves form purge plenums that are in fluid communication with the purge tube. Sealing interfaces on the fitting bodies maintain fluid-tight seals around the purge plenums as the barrier sleeves rotate about fitting bodies. The sample element includes a water-permeable membrane and passes inside the purge tube such that moisture in a sample gas flowing in a downstream direction through the sample element between the fitting body to the downstream fitting body passes moisture through the water-permeable membrane and into a purge gas flowing in the purge tube in one of an upstream direction or a downstream direction between the purge plenums.

20 Claims, 7 Drawing Sheets

MEMBRANE GAS DRYERS INCORPORATING ROTATABLE FITTINGS

CROSS REFERENCE TO RELATED APPLICATIONS

The present application is filed under 35 U.S.C. 111(a) as a continuation of international patent application no. PCT/US2011/025665, which international application designates the United States and claims the benefit of U.S. Provisional Application Ser. No. 61/308,161, filed Feb. 25, 2010.

FIELD OF THE INVENTION

The present invention is generally directed to membrane gas dryers, and in particular tubular membrane gas dryers that have rotatable attachment fittings.

BACKGROUND

Membrane gas dryers are used in a variety of industries and applications for regulating the humidity of a sample gas before the sample gas is introduced to measurement equipment. The readings taken by the measurement equipment may be prone to variation when sample gas having high humidity is introduced.

Previous gas dryers have used water permeable membranes to separate wet sample gas from dry purge gas. The water permeable membrane absorbs water from the sample gas and rejects the water into the purge gas, thus reducing the humidity of the sample gas. However, water permeable membranes are generally fragile, and thus repositioning the components of the gas dryers may tend to cause damage to the water permeable membranes. Accordingly, membrane gas dryers that incorporate rotatable fitting assemblies are required.

SUMMARY

In one embodiment, a membrane gas dryer includes an upstream fitting assembly, a downstream fitting assembly, a purge tube, and a sample element. The upstream fitting assembly includes an upstream fitting body, an upstream sealing interface, and an upstream barrier sleeve. The upstream fitting body includes an upstream axial passage that extends along a centerline axis of the upstream fitting body, an upstream counterbore that extends from an end of the upstream axial passage, and an upstream omni-directional channel arranged circumferentially around the upstream fitting body. The upstream barrier sleeve and the upstream omni-directional channel of the upstream fitting body form an upstream purge plenum in fluid communication with the upstream axial passage. The upstream sealing interface maintains a fluid-tight seal between the upstream barrier sleeve and the upstream fitting body as the upstream barrier sleeve rotates about the centerline axis of the upstream fitting body. The downstream fitting assembly includes a downstream fitting body, a downstream sealing interface, and a downstream barrier sleeve. The downstream fitting body includes a downstream axial passage that extends along a centerline axis of the downstream fitting body, a downstream counterbore that extends from an end of the downstream axial passage, and a downstream omni-directional channel arranged circumferentially around the downstream fitting body. The downstream barrier sleeve and the downstream omni-directional channel of the downstream fitting body form a downstream purge plenum in fluid communication with the downstream axial passage. The downstream sealing interface maintains a fluid-tight seal between the downstream barrier sleeve and the downstream fitting body as the downstream barrier sleeve rotates about the centerline axis of the downstream fitting body. An upstream portion of the purge tube is secured within the upstream counterbore of the upstream fitting body and a downstream portion of the purge tube is secured within the downstream counterbore of the downstream fitting body such that the purge tube is in fluid communication with the upstream axial passage of the upstream fitting body and the downstream axial passage of the downstream fitting body. The sample element includes a water-permeable membrane and passes inside the purge tube such that moisture in a sample gas flowing in a downstream direction through the sample element from the upstream fitting body to the downstream fitting body passes moisture through the water-permeable membrane and into a purge gas flowing in the purge tube in one of an upstream direction or a downstream direction between the upstream purge plenum and the downstream purge plenum.

In another embodiment, a fitting assembly includes a fitting body, a sealing interface, and a barrier sleeve. The fitting body includes an axial passage that extends along a centerline axis of the fitting body, a counterbore that extends from an end of the axial passage, and an omni-directional channel arranged circumferentially around the fitting body. The barrier sleeve and the omni-directional channel of the fitting body form a purge plenum in fluid communication with the axial passage. The sealing interface maintains a fluid-tight seal between the barrier sleeve and the fitting body as the barrier sleeve rotates about the centerline axis of the fitting body.

BRIEF DESCRIPTION OF THE DRAWINGS

The following detailed description of specific embodiments of the present invention can be best understood when read in conjunction with the drawings enclosed herewith.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Embodiments of the present invention are directed to membrane gas dryers having fluid handling components that rotate about fitting bodies while maintaining a fluid-tight seal with the fitting body. Membrane gas dryers according to the present disclosure allow a sample gas to flow from an upstream fitting to a downstream fitting through the inside of a water-permeable membrane. Purge gas flows around the water-permeable membrane in a purge tube. The sample gas and the purge gas each flow in a fluid-tight passage, such that the sample gas and the purge gas do not mix with one another. The rotating components of the membrane gas dryers allow fittings through which the purge air is introduced into the membrane gas dryer to rotate about fitting bodies while maintaining fluid-tight paths of flow for both the sample gas and the purge gas.

As used herein, "upstream" and "downstream" refer to the direction that the sample gas flows through the membrane gas dryer. Purge gas that is introduced into the membrane gas dryer may flow in the same direction as the sample gas (i.e., co-flow) or the purge gas may flow in the direction opposite to the sample gas (i.e., counter-flow).

Figure 1:
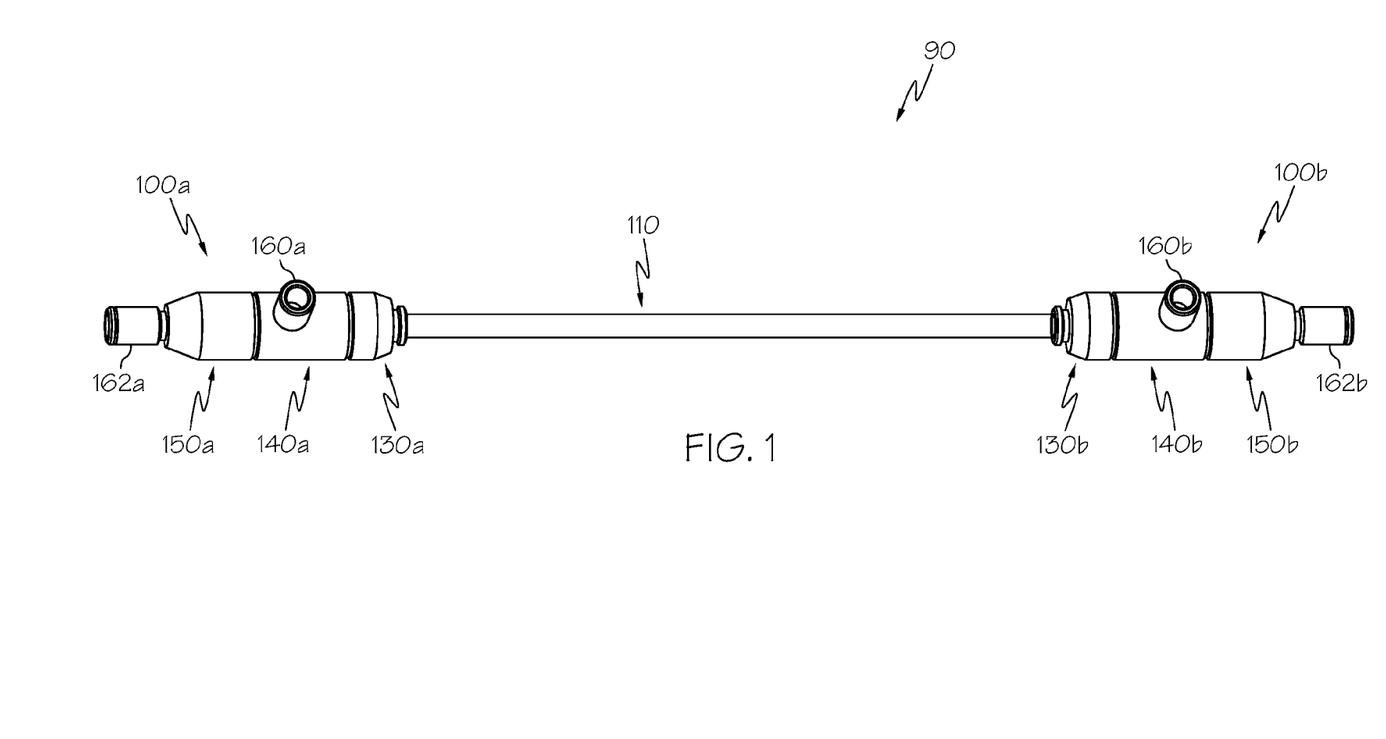
FIG. 1 depicts a schematic representation of a membrane gas dryer according to one or more embodiments shown and described herein.
Figure 2:
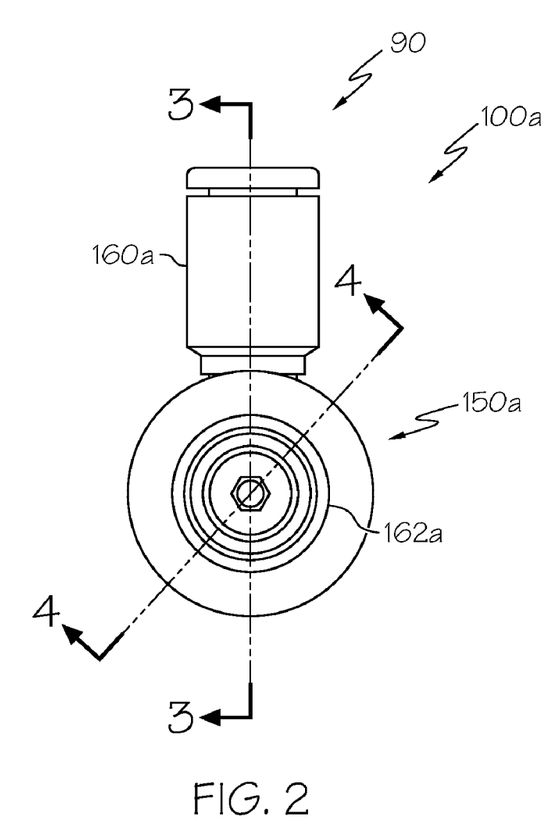
FIG. 2 depicts an end view of a membrane gas dryer according to one or more embodiments shown and described herein.

As depicted in FIG. 1, a membrane gas dryer 90 includes an upstream fitting assembly 100a, a downstream fitting assembly 100b, and a purge tube 110. The upstream fitting assembly 100a and the downstream fitting assembly 100b are arranged at opposite ends of the purge tube 110, and a sample element (not shown) passes through the purge tube 110 from the upstream fitting assembly 100a to the downstream fitting assembly 100b. In one embodiment of the membrane gas dryer 90, the upstream fitting assembly 100a and the downstream fitting assembly 100b include the same subcomponents, such that the upstream fitting assembly 100a and the downstream fitting assembly 100b are interchangeable with one another.

Figure 3A:
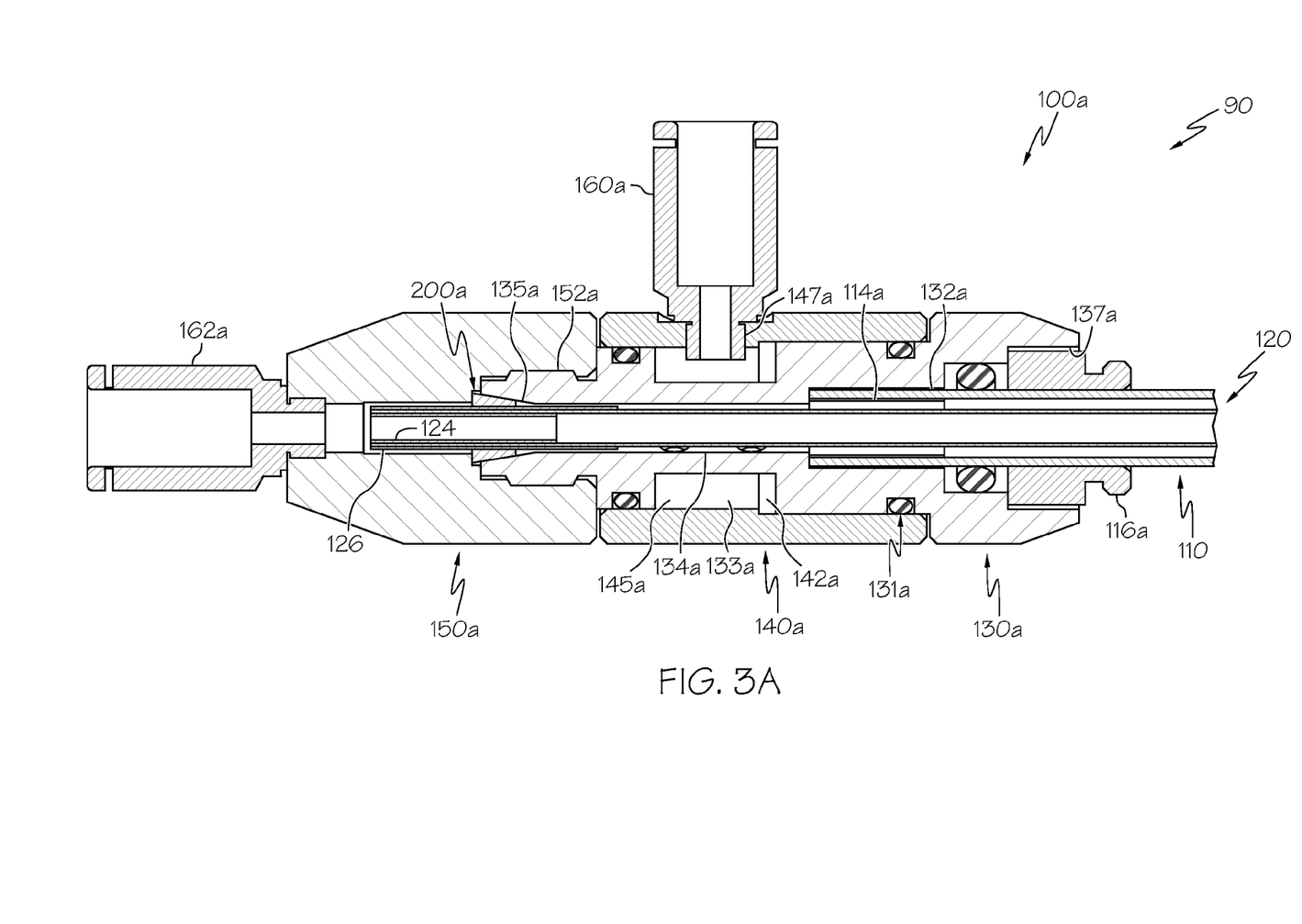
FIG. 3A depicts a section view of the membrane gas dryer of FIG. 2.

As depicted in FIG. 3A, the upstream fitting assembly 100a includes an upstream fitting body 130a, an upstream sealing interface 131a arranged around the upstream fitting body 130a, and an upstream barrier sleeve 140a that surrounds a portion of the upstream fitting body 130a. The upstream fitting body 130a includes an upstream axial passage 134a that extends along the centerline axis of the upstream fitting body 130a such that the center of the upstream fitting body 130a is open along its length. An upstream counterbore 132a extends from one end of the upstream axial passage 134a. The upstream counterbore 132a is larger than the upstream axial passage 134a. The upstream fitting body 130a further includes an upstream omni-directional channel 133a that is arranged circumferentially around the upstream fitting body 130a.

Figure 4:
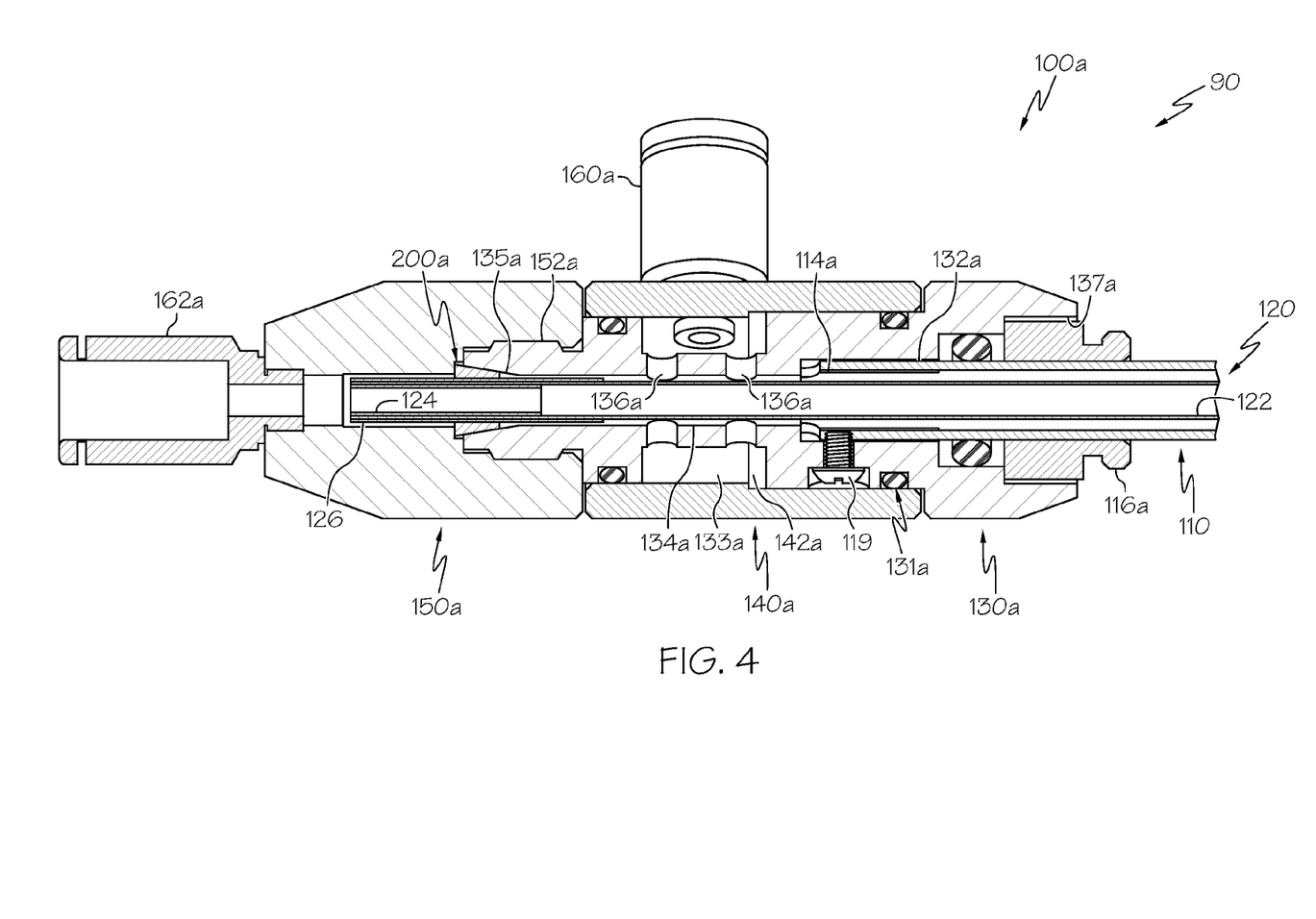
FIG. 4 depicts a section view of the membrane gas dryer of FIG. 2.

The upstream barrier sleeve 140a is arranged around the upstream fitting body 130a in an axial location that corresponds to the upstream omni-directional channel 133a. The upstream barrier sleeve 140a and the upstream omni-directional channel 133a of the upstream fitting body 130a form an upstream purge plenum 145a in fluid communication with the upstream axial passage 134a. As depicted in FIG. 4, and shown in greater detail in FIG. 5, a plurality of upstream purge vent holes 136a are located within the upstream omni-directional channel 133a and pass through the upstream fitting body 130a, such that the upstream omni-directional channel 133a, and therefore the upstream purge plenum 145a, is in fluid communication with the upstream axial passage 134a.

The sample element 120 includes a water-permeable membrane, formed from a sulfonated tetrafluoroethylene based fluoropolymer-copolymer, which is known under the trade name Nafion®. Among other properties, Nafion® is permeable to water, which allows water to be exchanged streams of gas adjacent to the water-permeable membrane without mixing the gases with one another. When sample gas is introduced into the membrane gas dryer 90 such that the sample gas flows in a downstream direction through the sample element 120 from the upstream fitting assembly 100a towards the downstream fitting assembly 100b, and a dry purge gas flows in the purge tube 110 in one of an upstream direction or a downstream direction between the upstream purge plenum 145a and the downstream purge plenum 145b, moisture passes from the sample gas through the water-permeable membrane of the sample element 120, and into the purge gas.

Figure 3B:
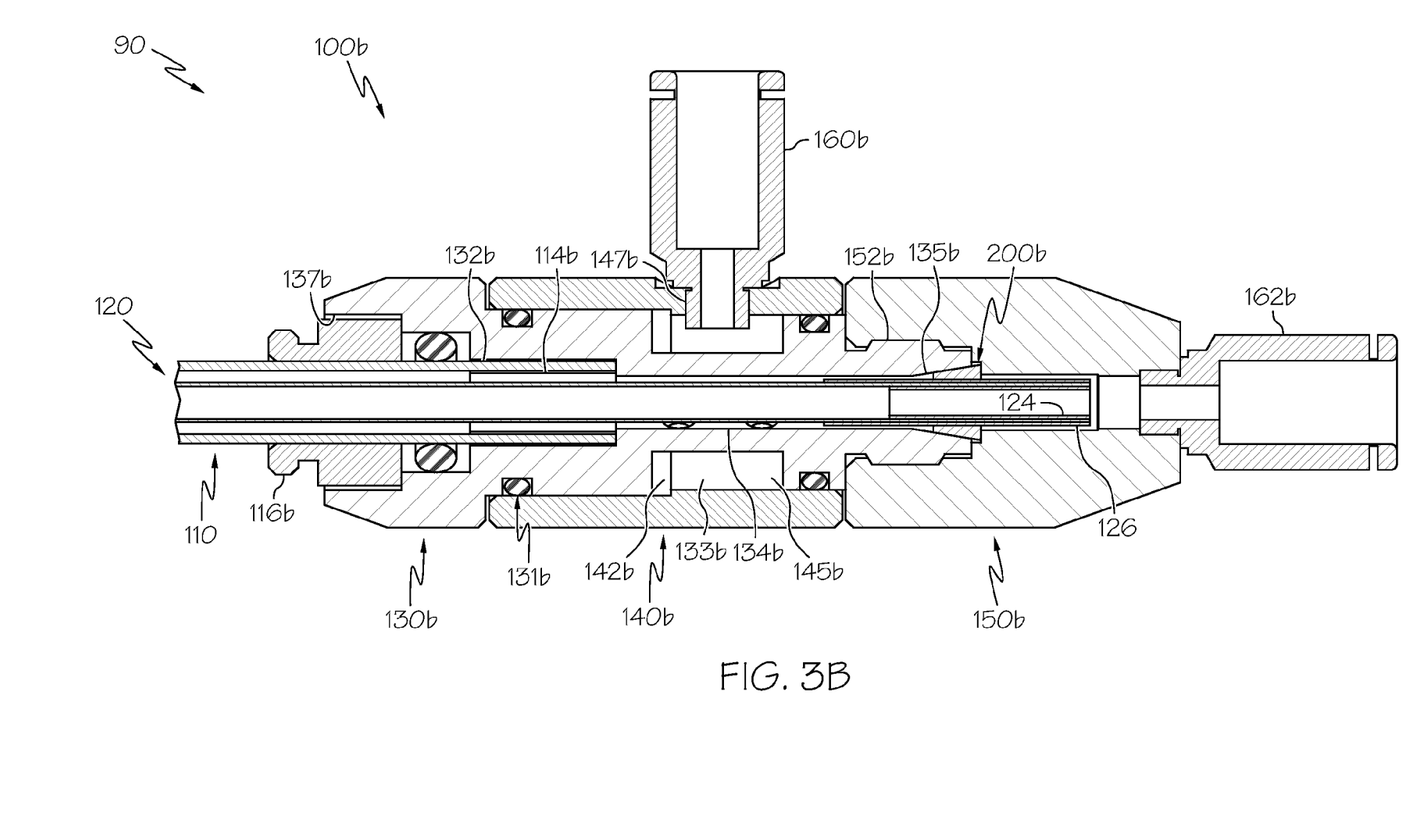
FIG. 3B depicts a section view of the membrane gas dryer of FIG. 2.

Referring to FIGS. 3A and 3B, an upstream portion of the purge tube 110 is secured within the upstream counterbore 132a of the upstream fitting body 130a and a downstream portion of the purge tube 110 is secured within the downstream counterbore 132b of the downstream fitting body 130b. As depicted in FIG. 4, the purge tube 110 includes an upstream reinforcement member 114a that extends along a portion of the purge tube 110. The purge tube 110 is retained axially by an upstream push-in type fitting 116a that mates with a recess 137a of the upstream fitting body 130a. A retention screw 119 is tightened against the purge tube 110 such that the retention screw 119 prevents the purge tube 110 from rotating relative to the upstream fitting body 130a. The upstream reinforcement member 114a prevents the retention screw 119 from collapsing the purge tube 110.

As depicted in FIG. 3B, a similar connection is used between the purge tube 110 and the downstream fitting body 130b, including a downstream push-in type fitting 116b that mates with a recess 137b of the downstream fitting body 130b. A retention screw is tightened against the purge tube 110 such that the retention screw prevents the purge tube 110 from rotating relative to the downstream fitting body 130a. A downstream reinforcement member 114b prevents the retention screw from collapsing the purge tube 110.

The interior of the purge tube 110 is aligned with the centerline axis of the upstream fitting body 130a and the centerline axis of the downstream fitting body 130b such that the purge tube 110 is in fluid communication with the upstream axial passage 134a of the upstream fitting body 130a and the downstream axial passage 134b of the downstream fitting body 130b.

Referring to FIG. 3A, the upstream sealing interface 131a forms a fluid-tight seal between the upstream barrier sleeve 140a and the upstream fitting body 130a. Because the upstream barrier sleeve 140a is free to rotate about the upstream fitting body 130a, the upstream sealing interface 131a maintains a fluid-tight seal as the upstream barrier sleeve 140a rotates about the centerline axis of the upstream fitting body 130a. An upstream purge port 147a passes through the upstream barrier sleeve 140a and an upstream purge fitting 160a is secured within the upstream purge port 147a. The upstream barrier sleeve 140a may be positioned at any orientation around the upstream fitting body 130a by rotating the upstream barrier sleeve 140a about the upstream fitting body 130a. Because this rotation does not affect the position or orientation of other components of the membrane gas dryer 90, the upstream purge fitting 160a may be rotated to mate with external purge fluid handling lines without disassembling the membrane gas dryer 90, and therefore minimizing the potential to cause damage to other components of the membrane gas dryer 90.

As depicted in FIG. 3B, the downstream fitting assembly 100b includes a downstream fitting body 130b, a downstream sealing interface 131b arranged around the downstream fitting body 130b, and a downstream barrier sleeve 140b that surrounds a portion of the downstream fitting body 130b. The downstream fitting body 130b includes a downstream axial passage 134b that extends along the centerline axis of the downstream fitting body 130b such that the center of the downstream fitting body 130b is open along its length. A downstream counterbore 132b extends from one end of the downstream axial passage 134b. The downstream counterbore 132b is larger than the downstream axial passage 134b. The downstream fitting body 130b further includes a downstream omni-directional channel 133b that is arranged circumferentially around the downstream fitting body 130b.

The downstream barrier sleeve 140b is arranged around the downstream fitting body 130b in an axial location that corresponds to the downstream omni-directional channel 133b. The downstream barrier sleeve 140b and the downstream omni-directional channel 133b of the downstream fitting body 130b form a downstream purge plenum 145b in fluid communication with the downstream axial passage 134b.

The downstream sealing interface 131b forms a fluid-tight seal between the downstream barrier sleeve 140b and the downstream fitting body 130b. Because the downstream barrier sleeve 140b is free to rotate about the downstream fitting body 130b, the downstream sealing interface 131b maintains a fluid-tight seal as the downstream barrier sleeve 140b rotates about the centerline axis of the downstream fitting body 130b. A downstream purge port 147b passes through the downstream barrier sleeve 140b and a downstream purge fitting 160b is secured within the downstream purge port 147b. The downstream barrier sleeve 140b may be positioned at any orientation around the downstream fitting body 130b by rotating the downstream barrier sleeve 140b about the downstream fitting body 130b. Because this rotation does not affect the position or orientation of other components of the membrane gas dryer 90, the downstream purge fitting 160b may be rotated to mate with external fluid handling purge lines without disassembling the membrane gas dryer 90, and therefore minimizing the potential to cause damage to other components of the membrane gas dryer 90.

Figure 5:
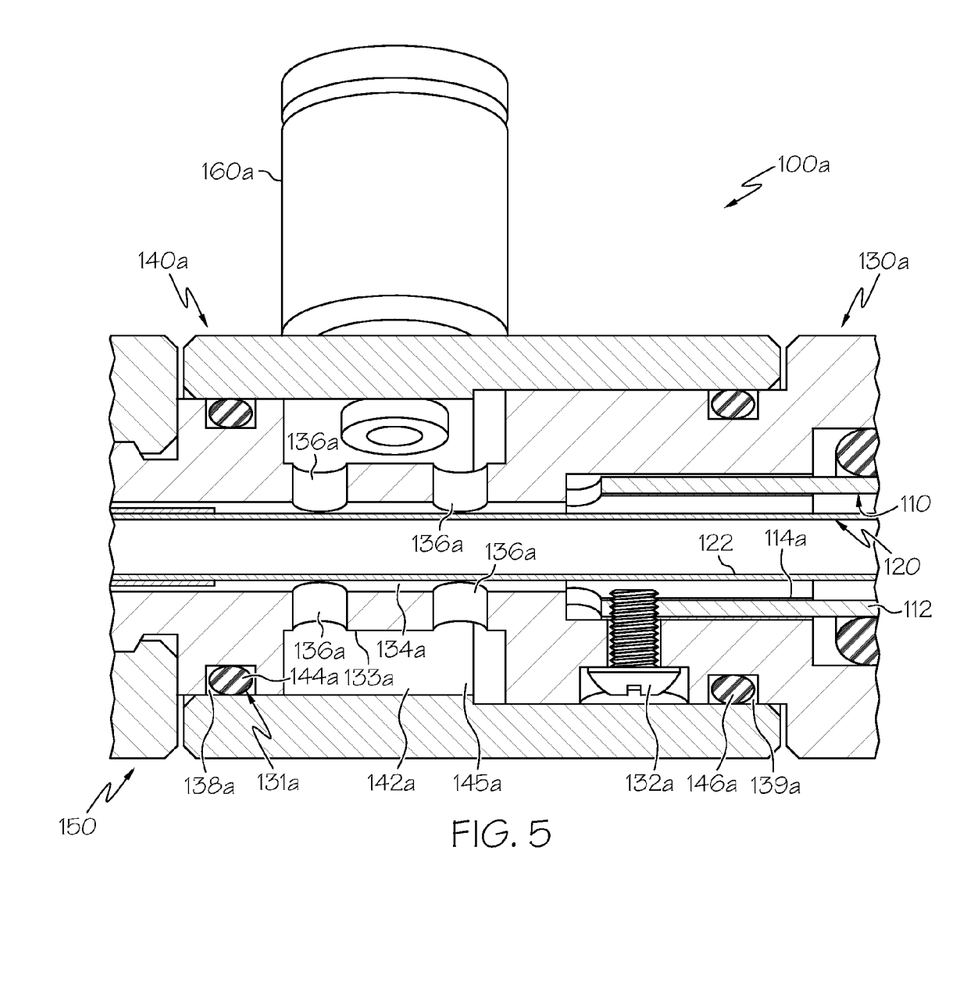
FIG. 5 depicts a section view of a membrane gas dryer according to one or more embodiments shown and described herein.

As depicted in FIG. 3A, the upstream sealing interface 131a creates a fluid-tight seal between the upstream fitting body 130a and the upstream barrier sleeve 140a. The upstream barrier sleeve 140a includes a cylindrical interior landing 142a that the upstream sealing interface 131a seals with. As shown in greater detail in FIG. 5, the upstream sealing interface 131a includes an outside upstream purge seal 144a that is retained in an outside upstream gland 138a formed in the upstream fitting body 130a around the centerline axis of the upstream fitting body 130a. The upstream sealing interface 131a also includes an inside upstream purge seal 146a that is retained in an inside upstream gland 139a formed in the upstream fitting body 130a around the centerline axis of the upstream fitting body 130a. As depicted in FIG. 5, the cylindrical interior landing 142a includes two cylindrical surfaces that are concentric with one another, where one cylindrical surface mates with the outside upstream purge seal 144a and the other cylindrical surface mates with the inside upstream purge seal 146a. In other embodiments, the cylindrical interior landing 142a may include a single, uniform cylindrical surface. Both the outside upstream purge seal 144a and the inside upstream purge seal 146a are held against the cylindrical interior landing 142a of the upstream barrier sleeve 140a to form a fluid-tight seal.

As depicted in FIG. 3B, the downstream sealing interface 131b creates a fluid-tight seal between the downstream fitting body 130b and the downstream barrier sleeve 140b. The downstream barrier sleeve 140b includes a cylindrical interior landing 142b that the downstream sealing interface 131b seals with.

The outside upstream purge seal 144a, the inside upstream purge seal 146a, the outside downstream purge seal 144b, and the inside downstream purge seal 146b may be selected from a variety of compliant seals, including, but not limited to, O-rings, X-rings, square rings, or piston rings.

An upstream tapered bore 135a is formed in the upstream fitting body 130a such that the upstream tapered bore 135a extends from an end of the upstream axial passage 134a opposite the upstream counterbore 132a. The upstream flange seal 200a is seated against the upstream tapered bore 135a of the upstream fitting body 130a, thereby creating a fluid-tight seal between the upstream flange seal 200a and the upstream tapered bore 135a. The sample element 120 of the membrane gas dryer 90 is held at the upstream fitting body 130a and at the downstream fitting body 130b so that the sample element passes through the inside of the purge tube 110. As depicted in FIG. 3A, an upstream flange seal 200a passes around the sample element 120. Further, because the upstream flange seal 200a extends over the sample element, the upstream flange seal 200a creates a fluid-tight seal between the upstream fitting body 130a and the sample element 120. Thus, any purge gas that surrounds the sample element 120 in the upstream axial passage 134a cannot flow past the upstream tapered bore 135a of the upstream fitting body 130a.

Similarly, as depicted in FIG. 3B, a downstream flange seal 200b passes around the sample element 120. A downstream tapered bore 135b is formed in the downstream fitting body 130b such that the downstream tapered bore 135b extends from an end of the downstream axial passage 134b opposite the downstream counterbore 132b. The downstream flange seal 200b is seated against the downstream tapered bore 135b of the downstream fitting body 130b, thereby creating a fluid-tight seal between the downstream flange seal 200b and the downstream tapered bore 135b. Further, because the downstream flange seal 200b extends over the sample element, the downstream flange seal 200b creates a fluid-tight seal between the downstream fitting body 130b and the sample element 120. Thus, any purge gas that surrounds the sample element 120 in the downstream axial passage 134b cannot flow past the downstream tapered bore 135b of the downstream fitting body 130b.

Figure 6:
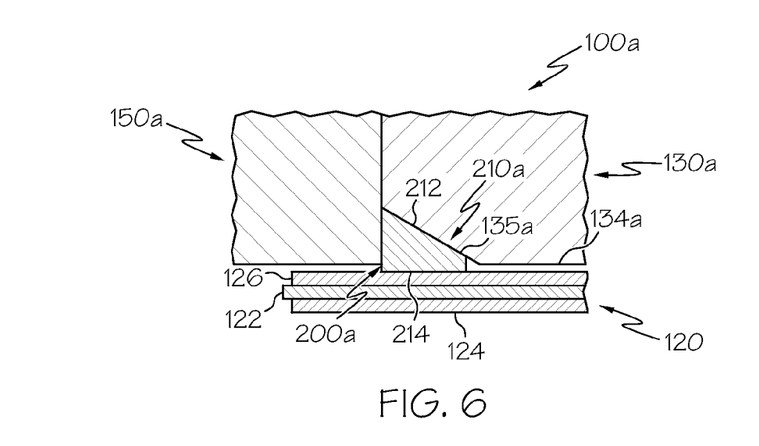
FIG. 6 depicts a section view of a membrane gas dryer according to one or more embodiments shown and described herein.
Figure 7:
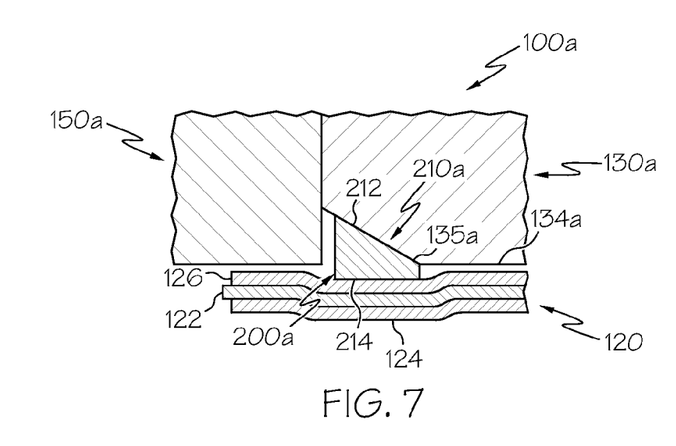
FIG. 7 depicts a section view of a membrane gas dryer according to one or more embodiments shown and described herein.

One embodiment of the upstream flange seal 200a is depicted in greater detail in FIGS. 6 and 7. In this embodiment, the upstream flange seal 200a is an upstream tapered seal 210a that includes a frustoconical exterior 212 and a cylindrical thru-hole 214 that extends along the centerline of the upstream tapered seal 210a. The upstream tapered seal 210a slides along the sample element 120. The frustoconical exterior 212 of the upstream flange seal 200a contacts the upstream tapered bore 135a of the upstream fitting body 130a. The upstream tapered seal 210a is made from an elastomer, for example Viton®, or other polymers, and is compliant under force, such that the upstream flange seal 200a forms a fluid-tight seal with the upstream tapered bore 135a of the upstream fitting body 130a.

The inside diameter of the cylindrical thru-hole 214 of the upstream tapered seal 210a is nominally larger than the outside diameter of the sample element 120. As the upstream tapered seal 210a is forced into the upstream tapered bore 135a of the upstream fitting body 130a, the upstream tapered bore 135a exerts an inward force on the frustoconical exterior 212. This inward force causes the cylindrical thru-hole 214 of the upstream tapered seal 210a to contract and apply an inward force on the sample element 120, such that the upstream tapered seal 210a couples the sample element 120 to the upstream fitting body 130a, and the upstream tapered seal 210a maintains a fluid-tight seal between the sample element 120 and the upstream fitting body 130a. Forcing the upstream tapered seal 210a into the upstream tapered bore 135a of the upstream fitting body 130a, therefore, prevents the sample member 120 from sliding through the cylindrical thru-hole 214 of the upstream tapered seal 210a.

To increase the strength of the sample element 120 in local regions that are adjacent to the upstream flange seal 200a and the downstream flange seal 200b, internal stiffening tubes 124 and external stiffening tubes 126 are placed around the membrane tube 122. The internal stiffening tubes 124 and the external stiffening tubes 126 increase the strength of the membrane tube 122, but do not prevent the membrane tube 122 from exchanging water between adjacent streams of gas along the majority of the length of the sample element 120. When being installed in a membrane gas dryer 90, the upstream flange seal 200a and the downstream flange seal 200b are translated inward towards the upstream fitting body 130a and the downstream fitting body 130b, respectively, along the external stiffening tubes 126 until the upstream flange seal 200a contacts the upstream tapered bore 135a of the upstream fitting body 130a and the downstream flange seal 200b contacts the downstream tapered bore 135b of the downstream fitting body 130b.

Nafion®, from which the membrane tube 122 of the sample element 120 is made, has a tendency to swell when placed in a wet (i.e., high humidity) environment and a tendency to contract when placed in a dry (i.e., low humidity) environment. For certain applications of the membrane gas dryers 90 where the sample gas and the purge gas are dry, the membrane tube 122 may tend to contract in length. If the membrane tube 122 were free to slide along the cylindrical center of the upstream flange seal 200a, the sample element 120 may tend to pull itself out of the upstream flange seal 200a, thus compromising the fluid-tight seal between the sample element 120 and the upstream fitting body 130a. If this fluid-tight seal were to become compromised during operation of the membrane gas dryer 90, sample gas would mix with purge gas, which would lead to erroneous measurement values of the sample gas, and may damage the measurement equipment. By applying an increased inward force on the sample element 120, the upstream flange seal 200a maintains a fluid-tight seal between the sample element 120 and the upstream fitting body 130a when the membrane tube 122 contracts.

FIG. 7 depicts an exaggerated representation (i.e., not-to-scale) of the relative movement of the upstream tapered seal 210a and the sample element 120 with lengthwise contraction of the membrane tube 122. Because the sample element 120 is coupled at either end to the upstream and downstream fitting bodies 130a, 130b, when the membrane tube 122 contracts lengthwise, it will tend to draw the upstream and downstream flange seals 200a, 200b inward towards the center of the sample element 120. As the membrane tube 122 contracts, the internal stiffening tube 124 and the external stiffening tube 126 are drawn towards the center of the sample element 120 (to the right, as depicted herein). Because the cylindrical thru-hole 214 of the upstream tapered seal 210a grips the sample element 120, the upstream tapered seal 210a follows the movement of the sample element 120 and slides into the upstream tapered bore 135a of the upstream fitting body 130a towards the center of the sample element 120. As the upstream tapered seal 210a translates inside the upstream tapered bore 135a in this direction, the upstream flange seal 200a is further compressed radially inward by the upstream tapered bore 135a. This additional radial inward compression causes the cylindrical thru-hole 214 of the upstream tapered seal 210a to apply an increased inward force on the sample element 120, further tightening the interface between the upstream tapered seal 210a and the sample element 120. Thus, as the membrane tube 122 contracts in length due to low humidity, the upstream tapered seal 210a applies increased inward force to the sample element 120 that prevents the sample element 120 from pulling itself out of the cylindrical thru-hole 214 of the upstream tapered seal 210a, and prevents the fluid-tight seal between the sample element 120 and the upstream fitting body 130a from being compromised.

Figure 8:
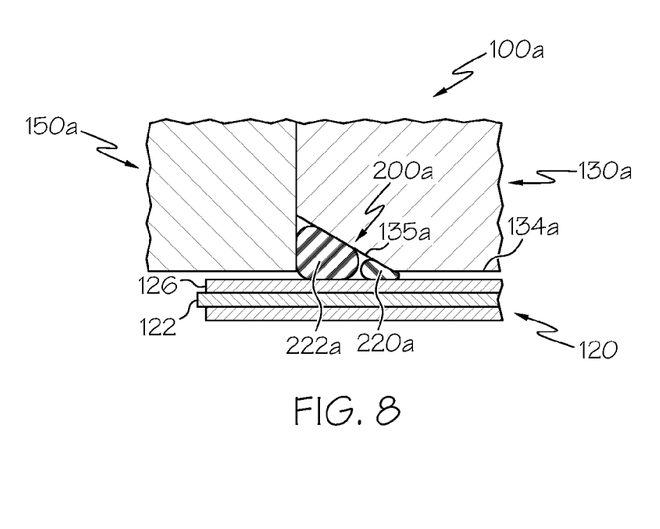
FIG. 8 depicts a section view of a membrane gas dryer according to one or more embodiments shown and described herein.

Another embodiment of the upstream flange seal 200a is depicted in FIG. 8. An upstream leading O-ring 220a and an upstream trailing O-ring 222a, each having different cross-sectional diameters, are installed over the sample element 120 and slid into the upstream tapered bore 135a of the upstream fitting body 130a. The upstream leading O-ring 220a is inserted deep into the upstream tapered bore 135a of the upstream fitting body 130a, while the upstream trailing O-ring 222a is inserted at a shallower depth into the upstream tapered bore 135a. The upstream leading and trailing O-rings 220a, 222a create a fluid-tight seal between the sample element 120 and the upstream fitting body 130a. As the upstream leading O-ring 220a and the upstream trailing O-ring 222a move deeper into the upstream tapered bore 135a, the upstream tapered bore 135a applies an inward force on the upstream leading and trailing O-rings 220a, 222a. This inward force causes the surfaces along the inner diameter of the upstream leading and trailing O-rings 220a, 222a to apply an inward force on the sample element 120, further tightening the interface between the upstream leading and trailing O-rings 220a, 222a and the sample element 120. Thus, similar to the embodiment discussed in regard to FIGS. 6 and 7, as the membrane tube 122 contracts in length due to low humidity, the upstream leading and trailing O-rings 220a, 222a apply additional inward force to the sample element 120 that prevents the sample element 120 from pulling itself out of the inner diameters of the upstream leading and trailing O-rings 220a, 222a.

Referring again to FIG. 3A, the membrane gas dryer 90 also includes an upstream end cap 150a that is coupled to the upstream fitting body 130a. The upstream end cap 150a is secured to the upstream fitting body 130a through an upstream threaded attachment 152a. The upstream flange seal 200a is located axially between the upstream end cap 150a and the upstream tapered bore 135a of the upstream fitting body 130*a*. As the upstream end cap 150*a* is tightened along the upstream threaded attachment 152*a*, the upstream end cap 150*a* may contact the upstream flange seal 200*a* and push the upstream flange seal 200*a* towards the upstream fitting body 130*a*, seating the upstream flange seal 200*a* in the upstream tapered bore 135*a* of the upstream fitting body 130*a*. The upstream end cap 150*a*, together with the upstream tapered bore 135*a* of the upstream fitting body 130*a*, limits the translation of the upstream flange seal 200*a*. Additionally, as previously discussed, because the upstream flange seal 200*a* exerts an inward force on the sample member 120, the upstream flange seal 200*a* couples the sample member 120 to the upstream fitting body 130*a*.

The upstream end cap 150*a* extends in a radial direction beyond the upstream sealed interface 131*a* of the upstream fitting body 130*a*. By extending beyond the upstream sealed interface 131*a*, the upstream end cap 150*a* acts as a mechanical stop that prevents the upstream barrier sleeve 140*a* from being translated out of axial position, which may compromise the fluid-tight seal between the upstream barrier sleeve 140*a* and the upstream fitting body 130*a*.

An upstream sample fitting 162*a* is secured to the upstream end cap 150*a* such that the upstream sample fitting 162*a* is in fluid communication with the sample element 120. The upstream sample fitting 162*a* may be connected to an external fluid handling line that supplies dry sample gas to gas analyzing equipment.

Referring again to FIG. 3B, the membrane gas dryer 90 also includes a downstream end cap 150*b* that is coupled to the downstream fitting body 130*b*. The downstream end cap 150*b* is secured to the downstream fitting body 130*b* through a downstream threaded attachment 152*b*. The downstream flange seal 200*b* is located axially between the downstream end cap 150*b* and the downstream tapered bore 135*b* of the downstream fitting body 130*b*. As the downstream end cap 150*b* is tightened along the downstream threaded attachment 152*b*, the downstream end cap 150*b* may contact the downstream flange seal 200*b* and push the downstream flange seal 200*b* towards the downstream fitting body 130*b*, seating the downstream flange seal 200*b* in the downstream tapered bore 135*b* of the downstream fitting body 130*b*. The downstream end cap 150*b*, together with the downstream tapered bore 135*b* of the downstream fitting body 130*b*, limits the translation of the downstream flange seal 200*b*. Additionally, as previously discussed, because the downstream flange seal 200*b* exerts an inward force on the sample member 120, the downstream flange seal 200*b* couples the sample member 120 to the downstream fitting body 130*b*.

The downstream end cap 150*b* extends in a radial direction beyond the downstream sealed interface 131*b* of the downstream fitting body 130*b*. By extending beyond the downstream sealed interface 131*b*, the downstream end cap 150*b* acts as a mechanical stop that prevents the downstream barrier sleeve 140*b* from being translated out of axial position, which may compromise the fluid-tight seal between the downstream barrier sleeve 140*b* and the downstream fitting body 130*b*.

A downstream sample fitting 162*b* is secured to the downstream end cap 150*b* such that the downstream sample fitting 162*b* is in fluid communication with the sample element 120. The downstream sample fitting 162*b* may be connected to an external fluid handling line that supplies wet sample gas to the membrane gas dryer 90.

The components of the membrane gas dryer 90 are made from materials that are inert to the gases that pass through the components. As discussed above, the membrane tube 122 is made from Nafion®. In one embodiment, the purge tube 110 is made from a fluorinated ethylene propylene (FEP) resin sold commercially as Teflon® FEP. The upstream fitting body 130*a*, the downstream fitting body 130*b*, the upstream barrier sleeve 140*a*, the downstream barrier sleeve 140*b*, the upstream end cap 150*a*, and the downstream end cap 150*b* are made from polyvinylide flouride (PVDF) sold commercially as Kynar®. All of these materials are non-reactive to the sample gas and the purge gas that are conveyed through the membrane gas dryer 90. In another embodiment, some or all of the components of the membrane gas dryer 90, including the purge tube 110 and the components of the upstream fitting assembly 100*a* and the downstream fitting assembly 110*b* may be made from metal, for example stainless steel, that is non-reactive to the sample gas and the purge gas that are conveyed through the membrane gas dryer 90.

It should now be understood that a membrane gas dryer may include tubular fitting assemblies that allow the purge fittings to be rearranged relative to the fitting bodies without compromising the fluid-tight seal between the sample fittings or the fluid-tight seal between the purge fittings. Embodiments of the membrane gas dryers as described above allow a sample gas having a high humidity to be dried by an adjacent flow of low-humidity purge gas without mixing the sample gas with the purge gas. Additionally, the tubular fitting assemblies include flange seals that apply an increased inward radial force to the sample element in the event that the sample element decreases in overall length. This inward radial force prevents the sample element from being pulled from the inner diameter of the flange seal, which otherwise may allow the sample gas to mix with the purge gas.

It is noted that the terms "substantially," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject mater. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A membrane gas dryer comprising an upstream fitting assembly, a downstream fitting assembly, a purge tube, and a sample element, wherein:
    the upstream fitting assembly comprises an upstream fitting body, an upstream sealing interface, and an upstream barrier sleeve;
    the upstream fitting body comprises an upstream axial passage that extends along a centerline axis of the upstream fitting body, an upstream counterbore that extends from an end of the upstream axial passage, and an upstream omni-directional channel arranged circumferentially around the upstream fitting body;
    the upstream barrier sleeve and the upstream omni-directional channel of the upstream fitting body form an upstream purge plenum in fluid communication with the upstream axial passage;
    the upstream sealing interface maintains a fluid-tight seal between the upstream barrier sleeve and the upstream fitting body as the upstream barrier sleeve rotates about the centerline axis of the upstream fitting body;

the downstream fitting assembly comprises a downstream fitting body, a downstream sealing interface, and a downstream barrier sleeve;

the downstream fitting body comprises a downstream axial passage that extends along a centerline axis of the downstream fitting body, a downstream counterbore that extends from an end of the downstream axial passage, and a downstream omni-directional channel arranged circumferentially around the downstream fitting body;

the downstream barrier sleeve and the downstream omni-directional channel of the downstream fitting body form a downstream purge plenum in fluid communication with the downstream axial passage;

the downstream sealing interface maintains a fluid-tight seal between the downstream barrier sleeve and the downstream fitting body as the downstream barrier sleeve rotates about the centerline axis of the downstream fitting body;

an upstream portion of the purge tube is secured within the upstream counterbore of the upstream fitting body and a downstream portion of the purge tube is secured within the downstream counterbore of the downstream fitting body such that the purge tube is in fluid communication with the upstream axial passage of the upstream fitting body and the downstream axial passage of the downstream fitting body; and the sample element comprises a water-permeable membrane and passes inside the purge tube such that moisture in a sample gas flowing in a downstream direction through the sample element from the upstream fitting body to the downstream fitting body passes moisture through the water-permeable membrane and into a purge gas flowing in the purge tube in one of an upstream direction or a downstream direction between the upstream purge plenum and the downstream purge plenum.

2. The membrane gas dryer of claim 1, wherein the upstream barrier sleeve of the upstream fitting assembly comprises an upstream cylindrical interior landing that contacts the upstream sealing interface of the upstream fitting body.

3. The membrane gas dryer of claim 1, wherein the upstream sealing interfacing of the upstream fitting assembly comprises an outside upstream purge seal retained in an outside upstream gland formed in the upstream fitting body around the centerline axis of the upstream fitting body and an inside upstream purge seal retained in an inside upstream gland formed in the fitting body around the centerline axis of the upstream fitting body.

4. The membrane gas dryer of claim 3, wherein the outside upstream purge seal and the inside upstream purge seal comprise O-rings, X-rings, square rings, or piston rings.

5. The membrane gas dryer of claim 1, wherein the upstream fitting body further comprises an upstream tapered bore extending from an end of the upstream axial passage opposite the upstream counterbore.

6. The membrane gas dryer of claim 5, further comprising an upstream flange seal that forms a fluid-tight seal between the sample element and the upstream tapered bore of the upstream axial passage of the upstream fitting body.

7. The membrane gas dryer of claim 6, wherein the upstream flange seal comprises an upstream tapered seal comprising a frustoconical exterior that is seated against the upstream tapered bore of the upstream fitting body and a cylindrical thru-hole that extends along the sample element.

8. The membrane gas dryer of claim 6, wherein the upstream flange seal comprises a leading upstream O-ring and a trailing upstream O-ring, wherein the leading upstream O-ring and the trailing upstream O-ring are seated against the upstream tapered bore of the upstream fitting body.

9. The membrane gas dryer of claim 6, further comprising an upstream end cap coupled to the upstream fitting body, wherein the upstream flange seal is located axially between the upstream end cap and the upstream tapered bore of the upstream fitting body.

10. The membrane gas dryer of claim 9, wherein the upstream end cap extends in a radial direction beyond the upstream sealing interface of the upstream fitting body.

11. The membrane gas dryer of claim 10, further comprising an upstream sample fitting coupled to the upstream end cap and in fluid communication with the sample element.

12. The membrane gas dryer of claim 1, wherein the upstream barrier sleeve of the upstream fitting assembly comprises an upstream purge port passing through an upstream wall of the upstream barrier sleeve, and wherein the upstream fitting assembly further comprises an upstream purge fitting arranged along an external surface of the upstream barrier sleeve and coupled to the upstream purge port.

13. The membrane gas dryer of claim 1, wherein the water-permeable membrane is a sulfonated tetrafluoroethylene based fluoropolymer-copolymer tube.

14. The membrane gas dryer of claim 1, wherein the sample element further comprises an upstream internal stiffening tube and an upstream external stiffening tube.

15. A fitting assembly comprising a fitting body, a sealing interface, and a barrier sleeve, wherein:

the fitting body comprises an axial passage that extends along a centerline axis of the fitting body, a counterbore that extends from an end of the axial passage, and an omni-directional channel arranged circumferentially around the fitting body;

the barrier sleeve and the omni-directional channel of the fitting body form a purge plenum in fluid communication with the axial passage; and the sealing interface maintains a fluid-tight seal between the barrier sleeve and the fitting body as the barrier sleeve rotates about the centerline axis of the fitting body.

16. The fitting assembly of claim 15, wherein the fitting body further comprises a tapered bore extending from an end of the axial passage opposite the counterbore.

17. The fitting assembly of claim 16, further comprising a flange seal that forms a fluid-tight seal with the tapered bore of the axial passage of the fitting body.

18. The fitting assembly of claim 17, wherein the flange seal comprises a tapered seal comprising a frustoconical exterior that is seated against the tapered bore of the fitting body and a cylindrical thru-hole that extends through the tapered seal.

19. The fitting assembly of claim 17, wherein the flange seal comprises a leading O-ring and a trailing O-ring, wherein the leading O-ring and the trailing O-ring are seated against the tapered bore of the fitting body.

20. The fitting assembly of claim 17, further comprising an end cap coupled to the fitting body, wherein the flange seal is located axially between the end cap and the tapered bore of the fitting body.

* * * * *